United States Patent [19]

Hale

[11] Patent Number: 5,302,223
[45] Date of Patent: * Apr. 12, 1994

[54] PERMANENT HEAT SENSITIVE TRANSFER PRINTING PROCESS

[75] Inventor: Nathan Hale, Mt. Pleasant, S.C.

[73] Assignee: Sawgrass Systems, Inc., Mt. Pleasant, S.C.

[*] Notice: The portion of the term of this patent subsequent to Sep. 21, 2010 has been disclaimed.

[21] Appl. No.: 724,610

[22] Filed: Jul. 2, 1991

Related U.S. Application Data

[63] Continuation-in-part of Ser. No. 549,600, Jul. 9, 1990.
[51] Int. Cl.$^5$ ............................................. B32B 31/00
[52] U.S. Cl. ................................. 156/230; 156/241; 8/471
[58] Field of Search ............... 156/230, 240, 583.1; 8/471; 346/76 PH

[56] References Cited

U.S. PATENT DOCUMENTS 4,021,591  5/1977  DeVries et al. ............... 156/240 X

FOREIGN PATENT DOCUMENTS 57-102390  6/1982  Japan .

*Primary Examiner*—David A. Simmons
*Assistant Examiner*—James J. Engel, Jr.
*Attorney, Agent, or Firm*—B. Craig Killough

[57] ABSTRACT

An image is permanently printed on an object by capturing the image, printing heat sensitive ink solids by thermal means onto a medium, and then transferring the ink solids from the medium to the object by applying sufficient heat to the ink solids to cause the heat sensitive ink to permanently bond to the object in the desired image. The heat sensitive transfer ink is printed onto the medium by thermal printing means at a temperature which will release and print the ink, but which is below the temperature which will cause the heat sensitive ink to bond permanently. The image is then transferred from the medium onto the object at a higher temperature which will cause the sensitive ink to permanently bond to the object.

3 Claims, 2 Drawing Sheets

PERMANENT HEAT SENSITIVE TRANSFER PRINTING PROCESS

This application is a continuation-in-part of application Ser. No. 07/549,600, filed Jul. 9, 1990.

BACKGROUND OF THE INVENTION

This invention relates to printing generally and more specifically relates to a method of transferring a design onto an object by means of printing heat sensitive ink in the desired design onto paper or other printable material by thermal means at a relatively low temperature, then transferring the design from the paper or printable material to an object on which the design is to permanently appear at a higher temperature which will cause the heat sensitive ink to bond to the object.

Words and designs are frequently printed onto clothing and other textile materials, as well as other objects. Common means of applying such designs to objects include the use of silk screens, and mechanically bonded thermal transfers. Silk screen process is well known in the art, and a mechanical thermal process to textile materials is described in Hare, U.S. Pat. No. 4,244,358.

The use of computer technology has allowed almost instantaneous printing of images. For example, video cameras or scanning may be used to capture an image on magnetic media such as computer hard disks or floppy disks. The image may then be printed by any suitable printing means, including mechanical thermal printers, wet printed (inkjet) heat sensitive transfers and laser printers.

The process of thermal transfers by mechanical means is described in Hare, U.S. Pat. No. 4,773,953. The art, as developed under this patent, is well known and defined in practice. The resulting mechanical image, as transferred, is a surface bonded image with a raised plastic like feel to the surface. The resulting printed image is stiff to the feel, has poor dimensional stability when stretched and poor color range.

Certain ink solids bond to or dye fabrics or other materials as a result of the application of heat. These ink solids liquify or sublimate upon the application of heat. Sublimation ink solids have been applied from pre-printed media, but the printing of such media with heat sensitive inks has not been done by thermal means at a temperature lower than that which activates the heat sensitive ink.

Sublimation ink solids change to a gas typically in a range of 140° F.-500° F., depending upon the particular ink solid chosen. Once the sublimation occurs, bonding of the ink solid to the application takes place, the ink is permanent and highly resistant to change or fading caused by laundry products.

SUMMARY OF THE PRESENT INVENTION

The present invention uses ink solids which may be affixed to an object by applying heat. This heat sensitive ink solid is transferred in the desired design by means of a thermal printer onto a medium, which will most commonly be paper. This initial thermal printing takes place at a temperature which is below that which will liquefy or sublimate the ink solid.

The image is then transferred from the medium onto the desired material. Dye diffusion, sublimation or other activation of the heat sensitive ink solid does not take place at the time of transfer from the ribbon to the print medium, but rather takes place at the time of the transfer of the image from the medium to the object onto which the image is to be applied. Accordingly, a higher temperature is used to apply the image from the medium than is used to print the image onto the medium.

The present invention allows the desired image to be transferred onto a medium almost instantaneously from the creation of the image. This image may be then permanently transferred from the medium onto the object on which it is to be displayed either at the same time, or "stored" by means of the medium to be permanently applied later as desired.

The process allows relatively low volumes of the design to be produced and printed onto a medium by thermal printing means using heat sensitive ink solids. By heat activating the heat sensitive transfer ink solids at the time of application of the image onto the object on which it is displayed, the design has a look of being "dyed in" when applied to a textile material. The image does not look or feel as though it has been topically applied. The image will stretch and move as the fabric moves, and is permanently affixed to the object.

DETAILED DESCRIPTION OF THE PREFERRED EMBODIMENT

Figure 1:
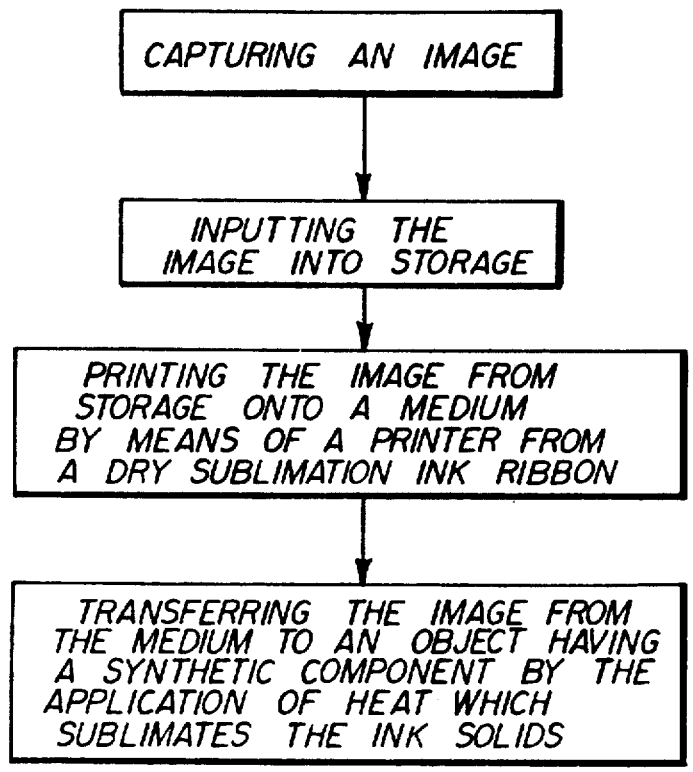
FIG. 1 is a block diagram showing the printing process.
Figure 2:
FIG. 2 illustrates an example of a design printed by a printer using the printing process.
Figure 3:
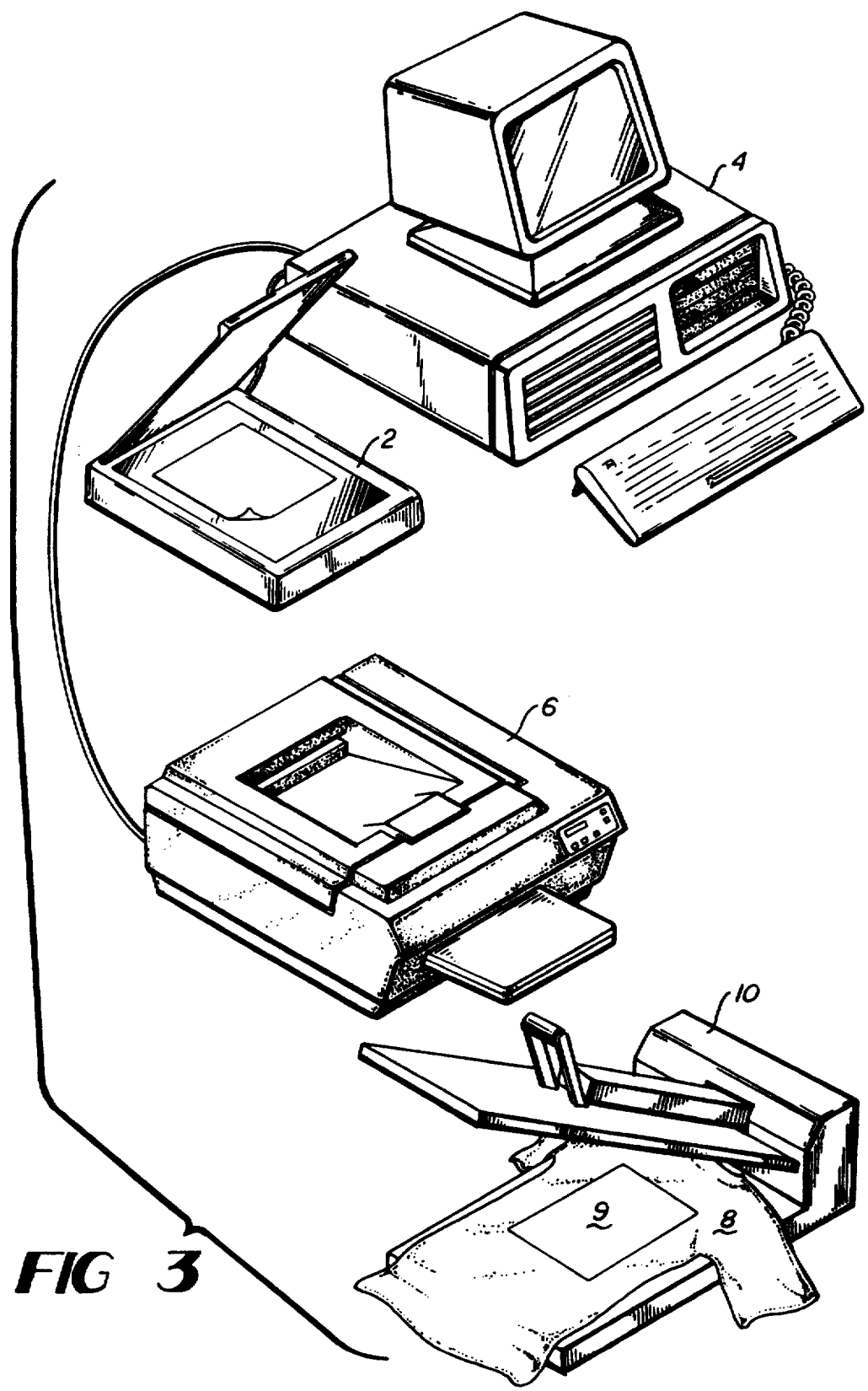
FIG. 3 is a diagram illustration showing exemplary elements of computer and printing systems which could be used to achieve the printing process.

In the preferred embodiment, a video camera or scanning device 2 may be used to capture an image 3. This image is then input into a computer 4. The computer directs a thermal printer 6 to print the image.

Any means of inputting an image into a computer may be used. Available computer design graphic software may be used, or still photography may be used. The design may be photographic, graphic artistic, or simply letters or words.

Virtually any thermal printer which will print in response to a computer may be used. In most applications, a printer which will print in multiple colors is desirable. A thermal printer which will print in what is known as "four pass" (four color) or "three pass" (three color) may be preferred.

In the present invention, ink solids are used, and are transferred to a medium in a dry, solid form by the printer. In the preferred embodiment, the heat sensitive transfer ink solids are transferred onto the medium, such as paper, by the printer from a ribbon on which the ink solids are bound.

The ribbon to be used with the printer may be a polyester ribbon. The dry ink solids may be retained on the polyester ribbon by the use of wax. The printer, such as a thermal printer, will transfer the ink in the desired design and colors from the ribbon to the medium at a temperature which is sufficient to release the ink solids from the binder, such as wax, but which is below the temperature which will cause any substantial liquification or sublimation of the ink solids. Typically, the binder will melt in a range of 130° F. to 225° F., so that the thermal printing of the ink solids onto the medium will take place within this range. The temperature range will, however, be dependent on the thermal printing means.

The quality of the image is achieved in part through the use of a means such as a ribbon to which the heat sensitive transfer ink solids are bonded by means of wax. The wax is melted by the thermal printer, which releases not only the ink solids, but also the wax, some of which is transferred to the medium. The wax aids in holding the heat sensitive transfer ink solids on the medium in the precise design, eliminating the need for special paper, while also producing an image which has high resolution.

Virtually any material may be used as a medium which can be printed upon by a printer, and which will withstand the higher transfer temperature, as is described herein. If a thermal printer is used, this medium may be any paper commonly used with thermal printers, however, standard bond paper could be used. Other materials, such as a sheet of metal could be used, if the metal sheet can be printed upon by the particular thermal printer employed.

Once the image is transferred onto the medium, the image may be permanently transferred onto an object presently, or at a later time. Most commonly, the design will be transferred onto a textile material, such as a shirt 8, although the image may be transferred onto other materials, such as metal, wood, or plastic The design 3, which is printed onto the medium 9, is placed against the object 8. A temperature which is sufficient to sublimate the ink solids or cause diffusion or other activation of the ink solids is then applied to the medium. A heat transfer machine 10 may be used to accomplish the transfer process.

The ink which is chosen is heat sensitive. The application of the relatively high heat of the transfer process causes a diffusion of the ink, or causes a sublimation of the ink, depending upon the particular ink chosen. For example, if a sublimation ink is chosen, it should be one which will sufficiently sublimate at a temperature above the temperature used to thermally print onto the medium so as to produce a good quality image. By way of example, a binder is chosen which will release the ink onto the medium by the thermal printer at around 200° F., while the transfer from the medium to the object will take place at around 400° F. In terms of a range, the thermal printing will typically take place at 130° F. to 225° F., while the transfer will take place at 250° F. to 500° F. However, if the thermal printing temperature is too close to the sublimation temperature, excessive sublimation may take place during the thermal printing process, and the ultimate print quality may not be acceptable. Therefore, the thermal printing temperature must be sufficient to properly release the ink, and the ink chosen should not have noticeable sublimation at the temperature at which thermal printing takes place. For other types of heat sensitive inks other than sublimation ink solids, these principles are the same. The thermal printing temperature must be below that at which diffusion ink solids will dye a textile material, for example.

What is claimed is:

1. A method of printing a multiple color design using heat sensitive ink solids, comprising the steps of:
   a. printing by the thermal means heat sensitive ink solids in at least three colors in a multiple color design onto a medium at a temperature which is below the temperature at which said heat sensitive ink solids activate; and
   b. transferring said heat sensitive ink solids from said medium to an object on which the multiple color design is to appear by thermal means at a temperature which will cause said heat sensitive ink solids to activate, and cause sufficient of said heat sensitive ink solids to bond to said object in the multiple color design.

2. A method of printing a multiple color design using heat sensitive ink solids, comprising the steps of:
   a. creating a multiple color design;
   b. printing by thermal means heat sensitive ink solids in at least three colors in said multiple color design onto a medium at a temperature which is in a range of temperatures below a temperature at which said heat sensitive ink solids activate and above a temperature which will cause said ink solids to be thermally transferred to said medium wherein the multiple color design is produced on said medium by said heat sensitive ink solids; and
   c. transferring said heat sensitive ink solids from said medium to an object on which the design is to appear by thermal means at a temperature which is in a range of temperatures which will cause said heat sensitive ink solids to activate, and cause said heat sensitive ink solids to bond to said object in the multiple color design.

3. A method of printing a multiple color design using heat sensitive ink solids, comprising the steps of:
   a. printing by thermal means heat sensitive ink solids in at least three colors bonded to a ribbon by means of wax at a temperature which is in a range of temperatures below a temperature at which heat sensitive ink solids activate, but above a temperature at which said wax will melt and release said heat sensitive ink solids from said ribbon onto said medium in a multiple color design wherein the multiple color design is produced on said medium by said heat sensitive ink solids; and
   b. transferring said heat sensitive ink solids from said medium to an object on which the design is to appear by thermal means at a temperature which is in a range of temperatures which will cause said heat sensitive ink solids to activate, and cause sufficient heat sensitive ink solids to bond to said object in the multiple color design.

* * * * *